Figure 1:
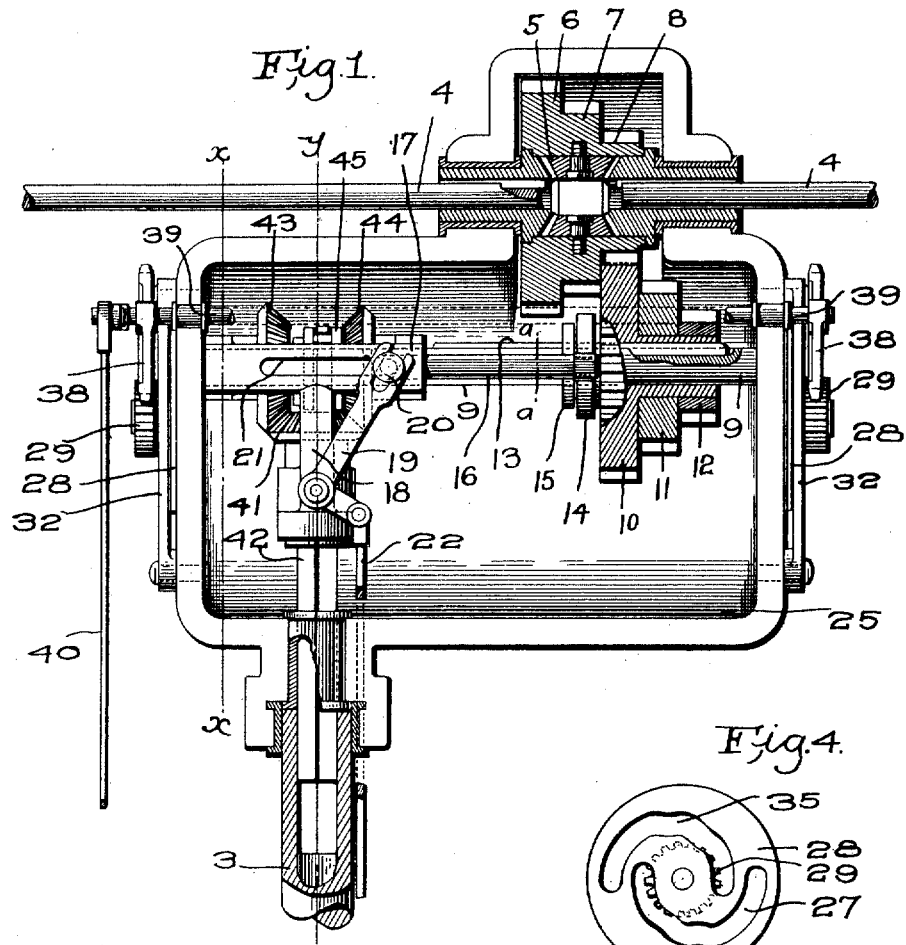

C. O. JOHNSON.
TRANSMISSION GEARING.
APPLICATION FILED NOV. 6, 1907.

989,979.

Patented Apr. 18, 1911.

2 SHEETS—SHEET 1.

Witnesses.
W. C. Lunsford
Joseph M. Ward

Inventor.
Charles O. Johnson,
By Crosby & Gregory attys

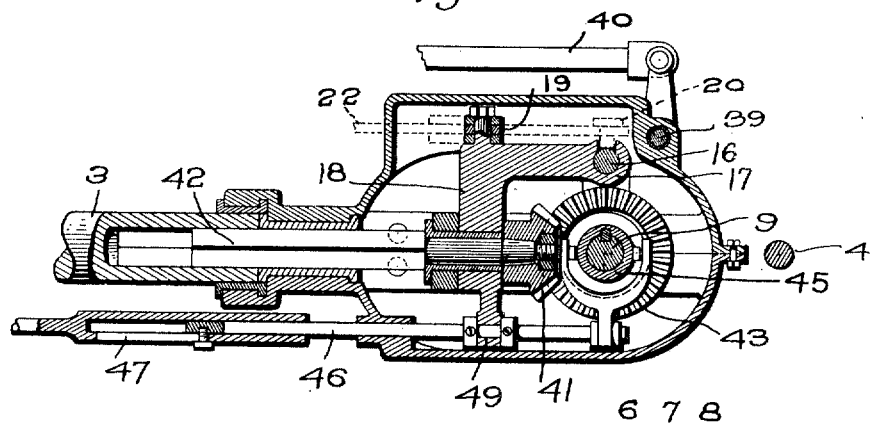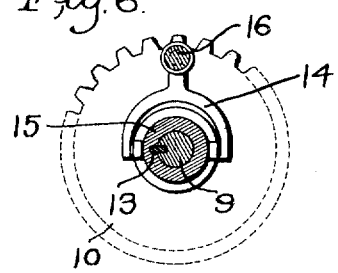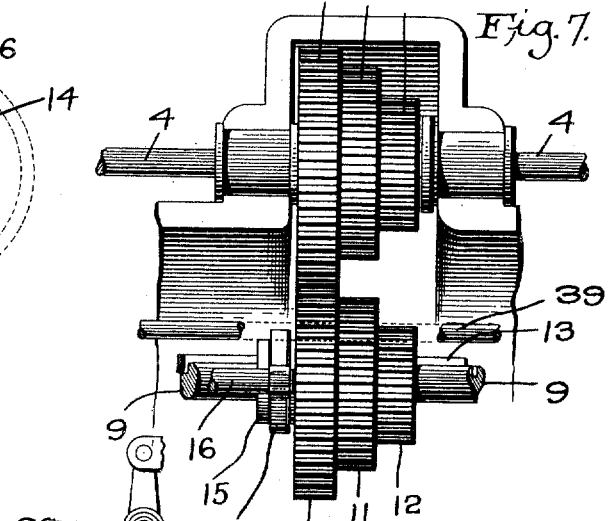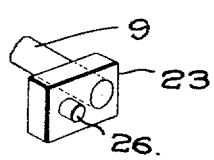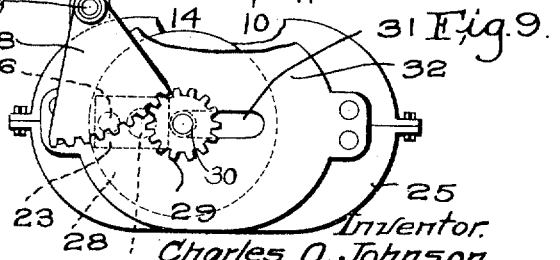

UNITED STATES PATENT OFFICE.

CHARLES O. JOHNSON, OF BOSTON, MASSACHUSETTS.

TRANSMISSION-GEARING.

989,979.  Specification of Letters Patent.  Patented Apr. 18, 1911.

Application filed November 6, 1907. Serial No. 401,042.

*To all whom it may concern:*

Be it known that I, CHARLES O. JOHNSON, a citizen of the United States, and a resident of Boston, in the county of Suffolk and State of Massachusetts, have invented an Improvement in Transmission-Gearing, of which the following description, in connection with the accompanying drawing, is a specification, like letters on the drawing representing like parts.

This invention relates to transmission gearing and has for its object to provide a novel transmission gearing which can be readily adjusted for rotating the driving member at different speeds, and by means of which the driven element can be reversed and driven in the reverse direction at any one of the speeds.

The invention also has for its object to provide a simple form of transmission gearing that is especially adapted for motor vehicles.

I will first describe one embodiment of my invention and then point out the novel features thereof in the appended claims.

Figure 4:
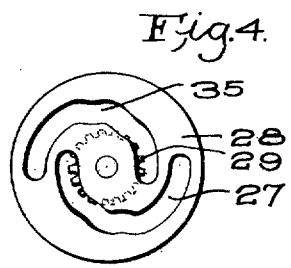
Figure 2:
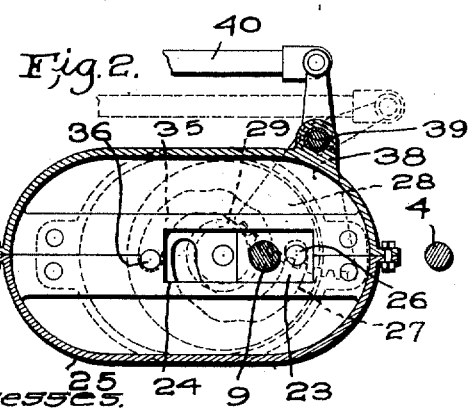
Figure 3:
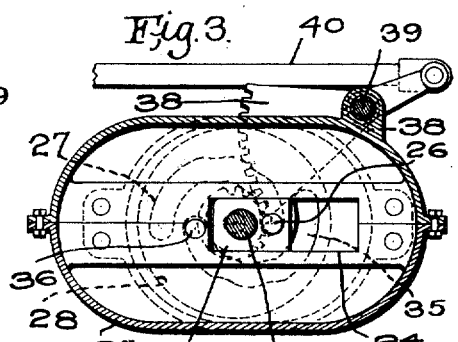

In the drawings Figure 1 is a top plan view partly in section of a transmission gearing embodying my invention; Figs. 2 and 3 are sections on the line $x$—$x$, Fig. 1, looking to the left showing the parts in different positions; Fig. 4 is a view of the cam plate; Fig. 5 is a section on substantially the line $y$—$y$, Fig. 1; Fig. 6 is a section on the line $a$—$a$, Fig. 1, looking to the right; Fig. 7 is a detail showing the gears set for giving an intermediate speed; Fig. 8 is a view of one of the sliding blocks in which the counter shaft is supported; Fig. 9 is an end view of the gear casing shown in Fig. 1.

The driving shaft or element of my transmission gearing is designated by 3 and driven element or shaft by 4.

The driven shaft has thereon a plurality of gears of different sizes, there being three such gears 6, 7 and 8, in the present embodiment of my invention. These gears may either be fast on the shaft 4 or may be connected to said shaft by means of any suitable or usual differential gearing 5 according to the way in which the transmission is used. If the transmission gearing is used in driving an automobile then the differential gearing 5 will preferably be employed.

The driven gears 6, 7 and 8 may be separate from each other or integral with each other as desired. In any event they are rigid with each other and serve to rotate the shaft 4 either by acting directly thereon or through the differential gearing 5.

The gears 6, 7 and 8 are driven by one or more intermediate gears mounted on a countershaft 9, and said countershaft is driven by the driving shaft 3 in some suitable manner.

The gear or gears which are mounted on the shaft 9 are adapted to mesh with either one of the gears 6, 7 and 8 according to the speed at which it is desired to drive the shaft 4. If the shaft 9 has only one gear thereon and there are three gears on the driven shaft then it would be possible to get three different speeds, but if the shaft 9 has additional gears thereon it is possible to get a greater number of speeds.

In the present embodiment of my invention I have shown three gears of different sizes on the shaft 9, said gears being designated 10, 11 and 12 respectively. These gears may either be integral with each other or separate, but in any event they are rigid with each other and are slidably mounted on the shaft 9. The shaft 9 is also mounted for movement toward and from the shaft 4 so that it is possible to shift the intermediate gears 10, 11, 12, to secure the desired speeds.

The gears are shown in Fig. 1 as they will be in developing the highest speed, this being done by causing the largest intermediate gear 10 to mesh with the smallest driven gear 8.

If the gear 10 is caused to mesh with the gear 7 the shaft 4 will be driven at a slightly slower speed, while if said gear 10 is caused to mesh with the gear 6, as shown in Fig. 7, a still slower speed will be developed.

If the gear 11 is brought into mesh with the gear 6 a still slower speed will be produced; while if the smallest intermediate gear 12 is brought into mesh with the gear 6, the low speed will be produced. Thus with six gears on the two shafts 4 and 9 five different speeds can be produced, and for every gear which is added to either shaft an additional speed can be produced.

In order to shift the intermediate gears into their different positions it is necessary that said gears should be slidably mounted on the shaft 9 and that the shaft 9 should be mounted to move toward and from the shaft 4.

The gears 10, 11 and 12 are splined to the shaft 9, as at 13, and are moved longitudinally of the shaft by means of a yoke 14 which embraces a grooved hub 15 integral with the gears, and which has connected thereto a rod 16 that is slidably mounted in a guide 17 carried by a suitable sliding frame 18. This sliding frame has pivoted thereto an elbow lever 19 one arm of which engages a pin 20 extending upwardly from the rod 16 and playing in a slot 21 in said guiding frame, and the other arm of which is connected to a link or other connection 22 leading to some convenient place from which the elbow lever can be manipulated.

For moving the shaft 9 toward and from the shaft 4 I have provided the following construction: The ends of the shaft 9 are sustained in bearing blocks 23 (one of which is shown in Fig. 8), and each bearing block is mounted in a slot or way 24 which may be formed in any suitable support, but which may conveniently be formed in the ends of the gear casing 25 within which the gearing is inclosed. Each block 23 has extending therefrom a pin 26 which engages a cam slot 27 in a cam plate 28. Each cam plate has rigid therewith a pinion or gear 29 by which it is turned, each pinion being connected to the cam plate by a hub 30 which extends through a slot 31 in a plate 32 secured to the end of the gear casing, the cam plate in the present embodiment being confined between the cover plate 32 and the end of the gear casing. With this construction it will be seen that as the cam plate is rotated the cam slots 27 will, by acting on the pins 26, cause the blocks 23 to move forward and backward in the slots 24 and thus the shaft 9 carried by the blocks 23 will be given its movement toward and from the shaft 4.

In order to give the blocks 23 a maximum throw with a comparatively small rotation of the cam plates and without making the cam slots in the cam plates too steep I provide each cam plate with a second cam slot 35 into which enters a fixed pin or projection 36 extending from the end of the gear casing. With this arrangement the turning of the cam shaft will operate both to give the cam plate a lateral movement because of the engagement of the pins 36 in the slots 35 and will at the same time cause the blocks 23 to move outward or inward relative to the axis of rotation of the cam plates by reason of the cam slots 27. This construction results in giving the blocks 23 a throw of twice the extent that would be produced by the cam slots 27 alone.

The slots 31 serve to guide the cam plates in their rolling and turning movement.

For turning the cam plates I have provided the two segmental gears 38, one for each of the pinions 29. These segmental gears are mounted on a cross shaft 39 which is suitably journaled in the gear casing and which may be operated by any suitable connection 40 leading to a convenient point.

Since the cam plates 28 have a bodily movement as well as a rotary movement it is necessary to make the segmental gears 38 of the shape shown so that the teeth thereof will be maintained in engagement with the pinions 29 at all times.

In Figs. 2 and 3 one of the cam plates 28 is shown in two different positions. In Fig. 2 the parts are in the position which they will assume when the shaft 9 is nearest shaft 4 with the gear 10 in mesh with the gear 8, as shown in Fig. 1. In Fig. 3 the parts are shown in the position they occupy when the shaft 9 has been thrown forwardly to permit the gear 10 to be brought into mesh with the gear 6.

The sliding frame 18 is provided with suitable bearings through which the shaft 9 passes, and said frame is carried by and is arranged to move forwardly and backwardly with the shaft 9.

In the present embodiment of my invention the driving shaft 3 stands at right angles to the shaft 9, and for transmitting motion from the driving shaft to the shaft 9 said driving shaft has connected therewith a bevel gear 41 which is adapted to mesh with a bevel gear on the countershaft 9.

The bevel gear 41 is shown as fast on a shaft section 42 which is non-circular in cross section, and which is adapted to telescope into the driving shaft 3, this construction being provided so as to permit the bevel gear 41 with the shaft 9 to move longitudinally of the shaft 3 without destroying the driving connection.

My invention also embodies a means for reversing the direction of rotation of the driven shaft 4 at any one of the different speeds. To accomplish this the shaft 9 has loosely mounted thereon two bevel gears 43 and 44 both of which mesh with the bevel gear 41. Said shaft also has thereon a clutch member 45 which is adapted to be thrown into clutching engagement with either of the bevel gears 43, 44. This clutch member may be operated by a rock shaft 46 which has a suitable telescopic connection 47 to permit the backward and forward movement of the shaft 9. I have also shown the rock shaft 46 as journaled in a bearing 49 carried by the sliding frame 18. With this construction it will be seen that the driving shaft 4 can be reversed without changing the speed and that the reversing involves merely the shifting of the clutch member 45.

In most transmission gearing the reversing can take place at the low speed only, and my invention has the advantage that the reversing can be accomplished at any one of the different speeds.

Having described my invention what I claim as new and desire to secure by Letters Patent is:—

1. In a transmission gearing, the combination with a driven shaft, of a plurality of gears of different sizes thereon, a countershaft, a plurality of gears of different sizes thereon, means to slide the gears on the countershaft, and cams acting on both ends of one of said shafts to move it toward and from the other shaft.

2. In transmission gearing, the combination with a driven shaft, of a differential gearing thereon including a plurality of gears of different sizes, a countershaft, a plurality of gears of different sizes thereon, means to move the gears on one of said shafts longitudinally thereof and cams for moving one of said shafts toward and from the other.

3. In transmission gearing, the combination with a driven shaft, of a gear thereon, a countershaft, a plurality of gears of different sizes thereon, means to move the gears longitudinally of the countershaft, two sliding blocks in which the countershaft is journaled, and a cam plate co-acting with each block for moving the countershaft toward and from the driven shaft.

4. In transmission gearing, the combination with a driven shaft, of a gear thereon, a countershaft, a plurality of gears of different sizes thereon, sliding blocks in which the ends of the countershaft are journaled, each block having a projecting pin, a rotary cam plate for each sliding block, each cam plate having a cam slot to receive the pin in said block, and means to rotate the cam plates.

5. In transmission gearing, the combination with a driven shaft, of a gear thereon, a countershaft, a plurality of gears of different sizes thereon, sliding blocks in which the ends of the countershaft are journaled, each block having a projecting pin, a rotary cam plate for each sliding block, each cam plate having a cam slot to receive the pin in said block, and a second cam slot, a fixed projection entering said second cam slot, and means to rotate the cam plates.

6. In a transmission gearing, the combination with a driven shaft, of a plurality of gears of different sizes thereon, a countershaft, a plurality of gears of different sizes thereon, means to shift the gears on the countershaft longitudinally thereof, means to move the countershaft toward and from the driven shaft, and reversing gearing for driving the countershaft.

7. In a transmission gearing, the combination with a driven shaft, of a plurality of gears of different sizes thereon, a countershaft, a plurality of gears of different sizes thereon, means to shift the gears on the countershaft longitudinally thereof, means to move the countershaft toward and from the driven shaft, and a driving shaft for rotating the countershaft, and reversing gearing between the driving shaft and the countershaft.

In testimony whereof, I have signed my name to this specification, in the presence of two subscribing witnesses.

CHARLES O. JOHNSON.

Witnesses:
MARGARET A. DUNN,
LOUIS C. SMITH.

---

Copies of this patent may be obtained for five cents each, by addressing the "Commissioner of Patents Washington, D. C."